3,318,145
APPARATUS FOR MEASURING DIFFERENTIAL PRESSURES
Ralph D. Lynn and Robert A. Kirby, Tulsa, Okla., assignors, by mesne assignments, to Esso Production Research Company, Houston, Tex., a corporation of Delaware
Filed Nov. 12, 1964, Ser. No. 410,568
3 Claims. (Cl. 73—152)

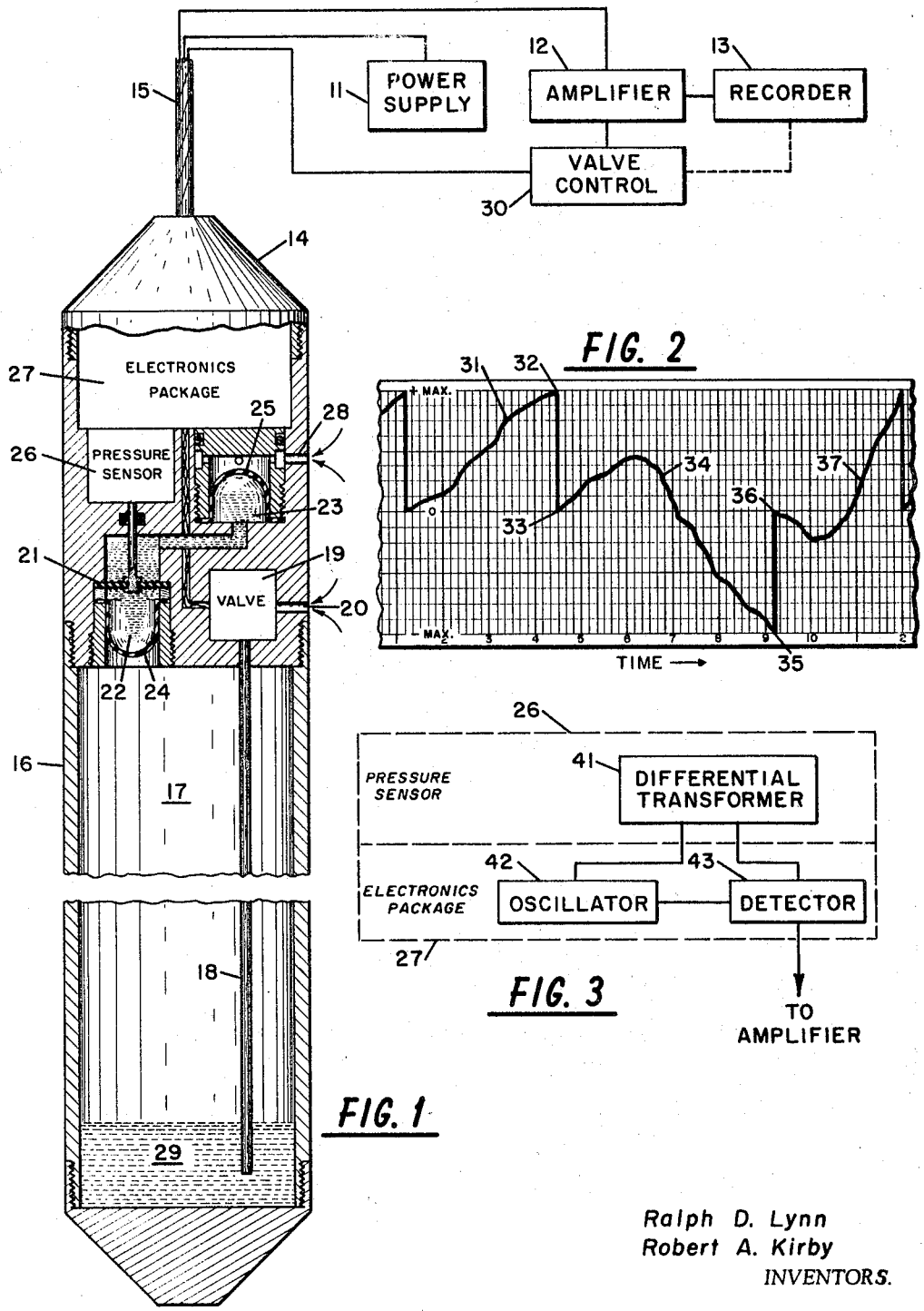

ABSTRACT OF THE DISCLOSURE

A differential pressure gauge for a wellbore, to be suspended by means of a multiconductor cable for transmitting the pressure data to amplification and recording equipment at the surface. A reference pressure chamber, enclosed by the housing, is connected to the exterior of the housing by two separate passageways. A differential pressure transducer is mounted within one passageway, while an automatic valve is provided in the remaining passageway. In response to the transducer output, the automatic valve is actuated to repeatedly rebalance the pressure on opposite sides of the transducer.

---

This invention relates to the measurement of extremely small pressure changes in an environment of high absolute pressure. The apparatus of the present invention provides a highly sensitive determination of small pressure changes as a function of time, without significant interruption or loss of sensitivity, even where the cumulative change in absolute pressure is more than one thousand-fold greater than the sensitivity. The preferred embodiment of the device is particularly suited for the measurement of pressure differentials experienced within deep boreholes, such as oil and gas wells.

The need for a more comprehensive description of subterranean reservoirs has long been recognized by the petroleum industry. Perhaps the most direct and simplest method for evaluating porous subterranean formations is to recover actual samples of the reservoir, such as obtained by conventional core-drilling techniques, and to subject the recovered core samples to various laboratory tests. If there were sufficient reason to believe that a substantial number of core analyses would provide a reliable assessment of gross reservoir characteristics, the need for further methods of reservoir description might well disappear. However, pronounced reservoir heterogeneities are comomnly recognized to be the general rule, rather than the exception. Consequently, no feasible number of core analyses can be expected to describe a reservoir adequately.

Various other methods of surveying a borehole, such as electrical logs, sonic velocity logs, and radioactivity logs are similarly ineffective to describe the general character of any substantial portion of a reservoir, since the information they provide is still limited to the general vicinity of the wellbore.

Realizing the need for methods of reservoir description which will reveal gross reservoir character, the industry has developed a great variety of bottom-hole pressure studies. One such study involves a determination of the rate at which pressure builds up in a well when it is shut in following a period of production. The plotting of a pressure buildup curve, and various related studies, although they may be conducted at a single well, do involve a substantial portion of the reservoir, and therefore provide valuable information which cannot be obtained from core studies or wellbore logs.

Pressure studies conducted within a single wellbore frequently require a considerable degree of accuracy in the measurement of pressure changes as a function of time. In a great majority of instances, however, a pressure gage having a sensitivity of plus or minus 0.5 p.s.i. is considered satisfactory.

Another type of pressure study, interference testing, may involve only two wells or it may involve an entire reservoir, including many dozens of wells. As readily understood by one skilled in the art, this test involves the generation of a pressure disturbance at one or more wells by introducing a substantial change in the rate of production or injection flow at these wells, while one or more remaining wells remain shut in and are used as observation wells. Given sufficient time, interference testing can result in pressure changes at the observation wells of sufficient magnitude to permit convenient use of conventional pressure gages. However, several weeks or months may be required to complete a satisfactory interference test if the pressure measurements obtained in responding wells are to be made with a sensitivity not substantially greater than 0.5 p.s.i.

Interference testing between wells on an extremely short-term basis is theoretically valid. For example, if a single well has been producing as much as 100 barrels of fluid per day for an extended period of time, it should be possible to generate a substantial pressure disturbance in the reservoir by closing in the well for an hour, or at a most for a few hours, and thereafter resuming normal production flow. A reliable record of the pressure fluctuations induced in surrounding wells as a result of this disturbance frequently requires a pressure gage having a sensitivity at least 100 times greater than is characteristic of commercially available downhole pressure gages.

Sensitivity alone is not enough. A suitable downhole gage for short-term between-wells pressure testing must also provide a quantitative output over an extremely wide range of absolute pressures. Commercial differential pressure transducers having sufficient sensitivity also have a very limited range of response.

The need for a downhole instrument having an extremely wide range of response is due primarily to the long-term transient change in pressure experienced in any reservoir. The long-term transient is usually a much slower change than the pressure differentials to be determined in accordance with the present invention. However, the amplitude of the long-term transient is generally much greater than the amplitudes of the responsive pressure pulses to be measured in an observation well. The total pressure change to which an instrument is subjected is the sum of the long-term transient plus the smaller pressure surge which results from the arrival of a disturbance in a spaced well. Therefore, a suitable pressure gage must be capable of providing a reliable, highly sensitive record of the long-term transient for a considerable period of time, prior to the arrival of the significant pressure data.

Accordingly, it is an object of the present invention to measure differential pressure changes as a function of time, with a sensitivity which is adequate to permit a reliable analysis of the data which remains after the subtraction of the long-term transient from the total pressure change. It is a further object of the invention to provide a system for the efficient utilization of a highly sensitive differential pressure transducer, in an environment of high absolute pressure, wherein the cumulative change in pressure is much greater than the normal range of transducer response.

The apparatus of the present invention includes means for balancing a reference pressure against the pressure of the environment wherein differential pressure changes, as a function of time, are to be measured. A highly sensitive differential pressure sensing element is subjected on one side of the reference pressure, and on the other side to the pressure of the environment. The output of the sensing device will normally reach the limit of its sensitive range long before a suitable record of significant pressure change is obtained. Means responsive to the output of the sensing element are provided for repeatedly re-establishing the initial balance of pressures between the reference chamber and the environment, whenever the output reaches a predetermined maximum.

In a preferred embodiment, for measuring downhole pressure changes, the apparatus comprises an elongated cylindrical housing member adapted for suspension within a wellbore by means of a multi-conductor cable for transmitting the pressure data to surface amplification and recording equipment. A reference pressure chamber, enclosed by the housing, is connected to the exterior of the housing by two separate passageways. A differential pressure transducer is mounted within one of the passageways, while an automatic valve is provided for opening and closing the remaining passageway at selected intervals.

The downhole instrument also includes suitable means for transmitting the output of the transducer to the surface equipment. A relay system is provided to open the valve whenever the transducer output reaches a predetermined maximum. An exact pressure balance between the reference chamber and the new pressure of the external environment is thereby re-established. Once the transducer output returns to zero, the valve is closed and a new cycle of operation is begun.

The sensing element of the transducer is preferably a thin diaphragm, which should be protected on both sides from the corrosive effect of borehole fluids, for example, by providing small reservoirs of oil or other liquid held in place by highly flexible membranes.

FIGURE 1 is a longitudinal cross-section of one embodiment of the invention, showing some of the parts diagrammatically.

FIGURE 2 is a sample of the record produced by the system of the invention.

FIGURE 3 is an example of the electronic equipment shown schematically in FIGURE 1.

The embodiment shown in FIGURE 1 is particularly suited for the determination of small pressure changes experienced within deep wellbores. The complete system includes power supply 11, amplification system 12, recorder 13, valve control 30, and downhole instrument 14, adapted for suspension within a wellbore by means of cable 15.

The essential components of the downhole instrument are enclosed by elongated cylindrical housing member 16. Reference pressure chamber 17 occupies by far the greatest portion of the internal volume of the housing member for reasons which will be explained below in connection with the operation of the tool. The reference chamber communicates with the external environment of the tool by means of conduit 18, valve 19, and port 20. The reference pressure of chamber 17 is transmitted to the lower side of diaphragm 21, while the pressure of the external environment is transmitted to the upper side of the diaphragm. The diaphragm is protected from the corrosive effects of wellbore fluids by means of liquid reservoirs 22 and 23, which are sealed in place by flexible membranes 24 and 25, respectively. The membranes and protective reservoirs transmit the reference and environmental pressures to the diaphragm without significant attenuation. The displacement of diaphragm 21 in response to a pressure differential is detected by sensor 26. The output of the sensor is transmitted directly by means of cable 15 to amplifier 12 and recorder 13. Whenever the displacement of diaphragm 21 reaches a predetermined limit within its sensitive range, relay system 30 actuates valve 19, opening reference chamber 17 to the external environment, which restores diaphragm 21 to a position of zero displacement. Valve 19 is then returned to its closed position for the beginning of a new cycle of operation.

In operation, the instrument is prepared for lowering into a borehole by setting valve 19 in the open position. Upon descent, the differential pressure acting upon diaphragm 21 will not exceed the difference in static fluid head which corresponds to the vertical distance between ports 20 and 28. Actually, the tool may readily be designed such that ports 20 and 28 are always located at the same depth, protecting the diaphragm from any significant pressure differential upon descent.

As the instrument is lowered into a liquid-filled borehole, reference chamber 17 is partially filled with liquid phase 29. At a depth of several thousand feet, the reference chamber may be 9/10 liquid-filled, with the remaining gas pocket under high compression. Since the sensitivity of the instrument is related to the gaseous volume contained within chamber 17, it is essential that chamber 17 be large enough to accommodate the influx of large volumes of liquid and yet provide a substantial gas phase when submerged at great depths.

In FIGURE 2 the record of transducer output indicates a period 31 of rising pressure, which corresponds to a downward displacement of diaphragm 21. As the transducer output is about to go "off-scale" at point 32, valve 19 is opened by control means 30, thereby restoring the diaphragm to its null position, as indicated by point 33 on the record. During the next time interval, the transducer output drifts upward at first, and then sharply downward as indicated by trace 34. At point 35 the diaphragm has reached a predetermined limit of upward deflection, which again actuates valve control 30, thereby restoring the diaphragm to its neutral position, as indicated by point 36 of the record. Subsequent deflection of the diaphragm in a downward direction is indicated by segment 37 of the record.

As illustrated in FIGURE 3, the preferred embodiment of the invention includes a differential transformer 41 to sense the deflection of diaphragm 21. The deflection of the diaphragm positions a core within the transformer coil, whereby the core-coil relationship modulates the electrical output of oscillator 42 to generate an output which is a function of diaphragm displacement. Detector 43 converts the transformer output to a voltage which is proportional to the differential pressure which causes the displacement of diaphragm 21. The detector output is transmitted to the surface equipment where it is amplified and recorded to produce a record such as illustrated by FIGURE 2.

A commercial example of a system which consists of a differential pressure cell and a differential transformer, together with suitable oscillator and detector circuits may be obtained from Ruska Instrument Corporation of Houston, Texas (Models 2416.1 and 2417.1). The Ruska system includes an oscillator of the ordinary inductance-capacitance type, the output from which is fed through a power amplifier to the primary winding of the differential transformer. The detector circuit is a phase sensitive demodulator. Various other examples of bi-directional differential pressure cells, sensors, and associated electronic circuits are available to perform these essential functions of the system of the present invention.

Valve 19 is preferably a solenoid-operated valve, set in a normally closed position. The valve is opened when a voltage is supplied to the solenoid by valve control means 30. The valve control means is preferably a relay system activated by a signal from amplifier 12. Optionally, the relay system may be actuated by a signal from the recorder, such as by providing the stylus with electrical contacts for completing a relay circuit whenever the stylus reaches a maximum or minimum boundary of the chart, as indicated by points 32 and 35 of FIGURE 2. A return of the transducer output to zero disconnects the solenoid from its power supply, thereby permitting the valve to return to its normally closed position.

What is claimed is:

1. A system for measuring small pressure changes at high absolute pressures which comprises a housing member enclosing a reference pressure chamber, said housing having first and second passageways therein leading from said chamber to the exterior of said housing, a differential pressure transducer mounted within said first passageway for detecting and measuring any differences in pressure between said reference pressure chamber and the exterior of said housing, valve means within said second passageway, means for amplifying and recording the output of said transducer, means for opening said valve whenever the output from said transducer reaches a predetermined maximum, and means for closing said valve when the output from said transducer returns to zero.

2. A system for measuring small pressure changes at high absolute pressures as defined by claim 1 wherein said differential pressure transducer comprises a flexible diaphragm subjected on one side to the pressure of said reference chamber and on the other side to the pressure of the exterior of said housing.

3. A system as defined by claim 1 wherein said housing member and its contents are adapted for suspension within a borehole by means of a multiconductor cable, and wherein the exterior ports of said first and second passageways are located at approximately the same position along the longitudinal axis of the downhole assembly.

References Cited by the Examiner
UNITED STATES PATENTS

| | | | |
|---|---|---|---|
| 2,459,268 | 1/1949 | Elkins | 73—398 |
| 2,713,266 | 7/1955 | Smith et al. | 73—398 |
| 2,942,473 | 6/1960 | Mayes | 73—388 |

RICHARD C. QUEISSER, *Primary Examiner.*

J. W. MYRACLE, *Assistant Examiner.*